(12) United States Patent
Hisada

(10) Patent No.: US 11,548,568 B2
(45) Date of Patent: Jan. 10, 2023

(54) VEHICLE STRUCTURE AND METHOD FOR STRENGTHENING VEHICLE STEEL PLATE

(71) Applicant: Toyota Jidosha Kabushiki Kaisha, Toyota Aichi-ken (JP)

(72) Inventor: Kohei Hisada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 302 days.

(21) Appl. No.: 16/751,786

(22) Filed: Jan. 24, 2020

(65) Prior Publication Data

US 2020/0239082 A1  Jul. 30, 2020

(30) Foreign Application Priority Data

Jan. 29, 2019  (JP) .............................. JP2019-013600

(51) Int. Cl.
*B62D 29/00* (2006.01)
*C21D 9/46* (2006.01)
*C21D 1/09* (2006.01)

(52) U.S. Cl.
CPC .............. *B62D 29/007* (2013.01); *C21D 1/09* (2013.01); *C21D 9/46* (2013.01)

(58) Field of Classification Search
CPC .... B23K 26/00; B23K 26/354; B23K 26/352; B23K 26/355; B23K 29/007; C21D 9/46; B62D 29/007; B62D 21/15
USPC ......................................... 296/187.1, 187.08
See application file for complete search history.

(56) References Cited

U.S. PATENT DOCUMENTS

| | | | | |
|---|---|---|---|---|
| 4,774,393 A | * | 9/1988 | Tarumoto | B23K 26/1476 219/121.84 |
| 7,011,359 B2 | * | 3/2006 | Watanabe | B62D 25/20 296/193.07 |
| 7,195,306 B2 | * | 3/2007 | Egawa | B62D 25/20 296/193.07 |
| 2013/0089282 A1 | * | 4/2013 | Nomura | F16C 33/1065 384/322 |
| 2013/0316188 A1 | * | 11/2013 | Mori | B23K 26/0006 219/121.69 |
| 2015/0209848 A1 | * | 7/2015 | Kopplin | B23K 26/0823 428/659 |
| 2016/0193698 A1 | * | 7/2016 | Hildebrand | B23K 26/082 219/121.68 |

(Continued)

FOREIGN PATENT DOCUMENTS

| | | | | |
|---|---|---|---|---|
| CN | 107881294 A | | 4/2018 | |
| EP | 1249505 A1 | * | 10/2002 | ............... C21D 1/09 |

(Continued)

*Primary Examiner* — D Glenn Dayoan
*Assistant Examiner* — Kevin P Weldon
(74) *Attorney, Agent, or Firm* — Dinsmore & Shohl LLP

(57) ABSTRACT

A hardened portion in a vehicle structure has an almost hemispherical shape around a lower surface side of a bottom wall rear portion in a vehicle upper-lower direction, the lower surface side serving as a center of a curvature. As the hardened portion is formed, a direction of tensile stress generated in the hardened portion is a radial direction in which the center of the curvature serves as a center side. Thus, occurrence of tensile stress in directions opposite to each other by which a specific part within the hardened portion is pulled apart in a direction orthogonal to the thickness direction of the bottom wall rear portion is inhibited.

4 Claims, 4 Drawing Sheets

(56) References Cited

U.S. PATENT DOCUMENTS

| | | | | |
|---|---|---|---|---|
| 2017/0129212 A1* | 5/2017 | Baumgart | ............... | B32B 15/18 |
| 2017/0225720 A1* | 8/2017 | Sanders | ............... | B62D 25/105 |
| 2018/0094334 A1 | 4/2018 | Harris et al. | | |
| 2019/0263345 A1* | 8/2019 | Tyan | ....................... | B62D 25/00 |
| 2021/0197899 A1* | 7/2021 | Hirose | ................... | B62D 25/20 |

FOREIGN PATENT DOCUMENTS

| | | | | |
|---|---|---|---|---|
| EP | 2565489 A1 | 3/2013 | | |
| JP | H0578731 A | 3/1993 | | |
| JP | H06172845 A | 6/1994 | | |
| WO | 2012/026578 A1 | 3/2012 | | |
| WO | WO-2017103127 A1 * | 6/2017 | ........... | B21D 22/022 |

* cited by examiner

10 VEHICLE STRUCTURE
32 HARDENED PORTION
34 BASE MATERIAL PORTION
40 HARDENED PORTION

VEHICLE STRUCTURE AND METHOD FOR STRENGTHENING VEHICLE STEEL PLATE

CROSS-REFERENCE TO RELATED APPLICATIONS

This application claims priority to Japanese Patent Application No. 2019-013600 filed on Jan. 29, 2019, which is incorporated herein by reference in its entirety including the specification, drawings and abstract.

BACKGROUND

1. Technical Field

The disclosure relates to a vehicle structure applied to a vehicle body, and a method for strengthening a vehicle steel plate.

2. Description of Related Art

In Japanese Unexamined Patent Application Publication No. 6-172845 (JP 6-172845 A), a steel plate is partially heated and re-solidified. Thus, a heated portion becomes a hardened portion that is harder than the remaining portion, and tensile strength of the steel plate is thus improved. In JP 6-172845 A, the hardened portion passes through the steel plate in a thickness direction of the steel plate. This means that, in this structure, the steel plate is partially heated and melted so as to be penetrated. Therefore, when the heated and melted portion of the steel plate is re-solidified in order to form the hardened portion, tensile stress is generated in the hardened portion, the tensile stress pulling apart the hardened portion in a direction orthogonal to the thickness direction of the steel plate from an almost center of the hardened portion in the direction orthogonal to the thickness direction of the steel plate. Thus, the hardened portion may become weak against external force input to the steel plate.

SUMMARY

In consideration of the above fact, an object of the disclosure is to obtain a vehicle structure that is able to inhibit a hardened portion from being weak against an input load, and to obtain a method for strengthening a vehicle steel plate.

A vehicle structure according to the first aspect includes a base material portion and a hardened portion. The base material portion is formed into a plate shape from a steel plate. The hardened portion that is formed as a part of the base material portion is heated and melted from a surface of the base material portion on a first side in a thickness direction through an intermediate portion of the base material portion in the thickness direction, and then cooled and solidified. A boundary between the hardened portion and the base material portion has a curved shape that is formed around the first side of the base material portion in the thickness direction, the first side of the base material portion serving as a center of a curvature. The hardened portion is harder than the base material portion.

With the vehicle structure according to the first aspect, because a part of the base material portion is heated and melted, and then cooled and solidified, the hardened portion harder than the base material portion is formed. As the hardened portion is formed, deformation and so on is inhibited in the hardened portion and in its vicinity, and it is thus possible to control deformation of the vehicle structure when a load is input to the vehicle structure.

Here, the hardened portion is formed as a part of the base material portion is heated and melted, and then cooled and solidified between the surface of the base material portion on the first side in the thickness direction and the intermediate portion of the base material portion in the thickness direction, and the boundary between the hardened portion and the base material portion (a shape of the hardened portion) is a curved shape formed around the first side of the base material portion in the thickness direction, the first side serving as the center of the curvature. Therefore, in the hardened portion, tensile stress is generated towards an outer side in a radius direction around the center side of the curvature of the hardened portion on the surface of the base material portion on the first side in the thickness direction of the base material portion. Hence, it is possible to inhibit generation of tensile stress in directions opposite to each other, especially generation of tensile stress in directions opposite to each other by which a specific part within the hardened portion is pulled apart in the direction orthogonal to the thickness direction of the base material portion. Thus, when a load is input to the vehicle structure, it is possible to inhibit generation of cracks and so on in the hardened portion.

A vehicle structure according to the second aspect is the vehicle structure described in the first aspect in which a diameter dimension of the hardened portion when the hardened portion is seen from a side of the thickness direction of the base material portion is at least twice as large as a maximum dimension of the hardened portion in the thickness direction of the base material portion.

In the vehicle structure according to the second aspect, when the diameter dimension of the hardened portion when the hardened portion is seen from the side of the thickness direction of the base material portion is twice as large as the maximum dimension of the hardened portion in the thickness direction of the base material portion, then the center of the curvature of the boundary between the hardened portion and the base material portion (the shape of the hardened portion) is positioned on the surface of the base material portion on the first side in the thickness direction of the base material portion. Therefore, among directions toward the radially inner side around the center of the curvature, the direction orthogonal to the thickness direction of the base material portion is present only on the surface of the base material portion on the first side in the thickness direction.

Further, when the diameter dimension of the hardened portion when the hardened portion is seen from the side of the thickness direction of the base material portion is more than twice as large as the maximum dimension of the hardened portion in the thickness direction of the base material portion, the center of the curvature of the boundary between the hardened portion and the base material portion (the shape of the hardened portion) is positioned away from the surface of the base material portion on the first side in the thickness direction further towards the first side of the base material portion in the thickness direction. Therefore, among the directions towards the radially inner side around the center of the curvature, the direction orthogonal to the thickness direction of the base material portion is present only on the first side of the base material portion in the thickness direction with respect to the surface of the base material portion on the first side in the thickness direction.

Therefore, with the vehicle structure, it is possible to inhibit generation of tensile stress in directions opposite to each other on the inner side of the hardened portion.

A vehicle structure according to the third aspect is the vehicle structure described in the first or second aspect in which three of the hardened portions are included. The three hardened portions are adjacent to each other in the direction orthogonal to the thickness direction of the base material portion. Also, a shape formed as centers of the hardened portions are connected with each other is an almost equilateral triangle in a view from the side of the thickness direction of the base material portion.

The vehicle structure according to the third aspect includes the three hardened portions that are adjacent to each other in the direction orthogonal to the thickness direction of the base material portion. Here, the shape formed as the centers of the three hardened portions are connected with each other is an almost equilateral triangle. Thus, in the hardened portions disposed as described above, it is possible to reduce an interval among the three hardened portions.

A vehicle structure according to the fourth aspect is the vehicle structure described in the third aspect in which the hardened portions are disposed in a staggered pattern when the hardened portions are seen from the first side of the base material portion in the thickness direction. A relation between an interval p between the centers of the hardened portions adjacent to each other, and a diameter dimension d of each of the hardened portions satisfies a following formula (1).

$$p < \frac{2}{\sqrt{3}} \cdot d \qquad \text{Formula (1)}$$

In the vehicle structure according to the fourth aspect, the hardened portions are disposed in the staggered pattern when the hardened portions are seen from the first side of the base material portion in the thickness direction. Further, the relation between the interval p between the centers of the hardened portions adjacent to each other, and the diameter dimension d of each of the hardened portions adjacent to each other satisfies the following formula (1).

$$p < \frac{2}{\sqrt{3}} \cdot d \qquad \text{Formula (1)}$$

Therefore, in the view from the direction orthogonal to the thickness direction of the base material portion, the hardened portions overlap each other.

A vehicle structure according to the fifth aspect is the vehicle structure described in any one of the first to fourth aspects in which the hardened portions are formed on both a surface side and a back surface side of the base material portion in the thickness direction, respectively.

In the vehicle structure according to the fifth aspect, the hardened portions are formed on the surface side and the back surface side of the base material portion in the thickness direction, respectively. Therefore, strain generated in the vehicle structure because the hardened portion is formed on the surface side of the base material portion in the thickness direction, and strain generated in the vehicle structure because the hardened portion is formed on the back surface side of the base material portion in the thickness direction act on each other so as to cancel each other.

A vehicle structure according to the sixth aspect is the vehicle structure described in the fifth aspect in which the hardened portions are disposed in line at given intervals on the surface side. The hardened portion on the back surface side is disposed between the hardened portions adjacent to each other on the surface side. Further, each of the hardened portions on the surface side and each of the hardened portions on the back surface side overlap each other in a view in an array direction of the hardened portions on the surface side.

In the vehicle structure according to the sixth aspect, hardened portions are disposed in line at given intervals on the surface side of the base material portion in the thickness direction, and the hardened portion on the back surface side of the base material portion in the thickness direction is disposed between the hardened portions adjacent to each other on the surface side. Moreover, each of the hardened portions on the surface side of the base material portion in the thickness direction and each of the hardened portions on the back surface side of the base material portion in the thickness direction overlap each other in the view in the array direction of the hardened portions on the surface side of the base material portion in the thickness direction. Therefore, strain generated in the vehicle structure because the hardened portion is formed on the surface side of the base material portion, and strain generated in the vehicle structure because the hardened portion is formed on the back surface side of the base material portion in the thickness direction act on each other so as to cancel each other.

A method for strengthening a vehicle steel plate according to the seventh aspect includes heating and melting the steel plate in a dot shape from a first side of the steel plate in a thickness direction, stopping heating of the steel plate in a state where a melted portion of the steel plate has not yet reached a surface of the steel plate on a second side in the thickness direction, and cooling and hardening the melted portion of the steel plate so that a hardened portion is formed and that a boundary between the melted portion and a base material portion that is not melted in the steel plate has a curved shape formed around the first side of the steel plate in the thickness direction, the first side serving as a center of a curvature.

In the method for strengthening the vehicle steel plate according to the seventh aspect, the steel plate is heated and melted in a dot shape from the first side of the steel plate in the thickness direction. The heating and melting of the steel plate are stopped in the state where the melted portion of the steel plate has not yet reached the surface of the steel plate on the second side of the steel plate in the thickness direction. Therefore, the boundary between the melted portion of the steel plate and the base material portion that is not melted in the steel plate is formed so as to have the curved shape formed around the first side of the steel plate in the thickness direction, the first side serving as the center of the curvature. Further, the melted portion of the steel plate is recrystallized when it is cooled and solidified. Due to the heating, melting, cooling, and solidifying of the steel plate, the hardened portion harder than the base material portion is formed. Therefore, generation of deformation and so on in the hardened portion and its vicinity is inhibited, and it is thus possible to control deformation of the vehicle structure when a load is input to the vehicle structure.

When the melted portion described above is cooled and solidified, contraction happens in the melted portion in a radial direction around the center side of the curvature. Therefore, in the hardened portion formed as a result of cooling and solidifying of the melted portion, tensile stress is generated towards the outer side in a radius direction around the center side of the curvature. Therefore, it is possible to inhibit generation of tensile stress in the directions opposite to each other, especially generation of the tensile stress in the directions opposite to each other by which a specific portion within the hardened portion is pulled apart in the direction orthogonal to the thickness direction of the base material portion. Thus, when a load is input to the vehicle structure, it is possible to inhibit occurrence of cracks and so on in the hardened portion.

As described so far, with the vehicle structure according to the first aspect and the method for strengthening the vehicle steel plate according to the seventh aspect, it is possible to inhibit generation of tensile stress in the directions opposite to each other in the hardened portion. Therefore, it is possible to inhibit the hardened potion from being weak against an input load.

With the vehicle structure according to the second aspect, it is possible to inhibit generation of tensile stress in the directions opposite to each other on the inner side of the hardened portion, and it is thus possible to effectively inhibit the hardened portion from being weak against an input load.

With the vehicle structure according to the third aspect, it is possible to dispose the hardened portions densely, and it is thus possible to effectively inhibit generation of deformation and so on in the hardened portion and its vicinity.

With the vehicle structure according to the fourth aspect, the hardened portions overlap each other when seen from the direction orthogonal to the thickness direction of the base material portion. Thus, it is possible to inhibit the vehicle structure from being weak against a load in a special direction orthogonal to the thickness direction of the base material portion.

With the vehicle structure according to the fifth aspect, it is possible to reduce an influence of strain caused by forming of the hardened portion.

With the vehicle structure according to the sixth aspect, it is possible to effectively reduce an influence of strain caused by forming of the hardened portion.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Next, an embodiment of the disclosure is described with reference to FIG. 1 to FIG. 4. In each of the drawings, an arrow FR represents a front side of a vehicle (a vehicle front side) to which a vehicle structure 10 according to the embodiment is applied. An arrow LH represents a left side in a vehicle width direction, and an arrow UP represents a vehicle upper side.

Configuration of Embodiment

Figure 3:
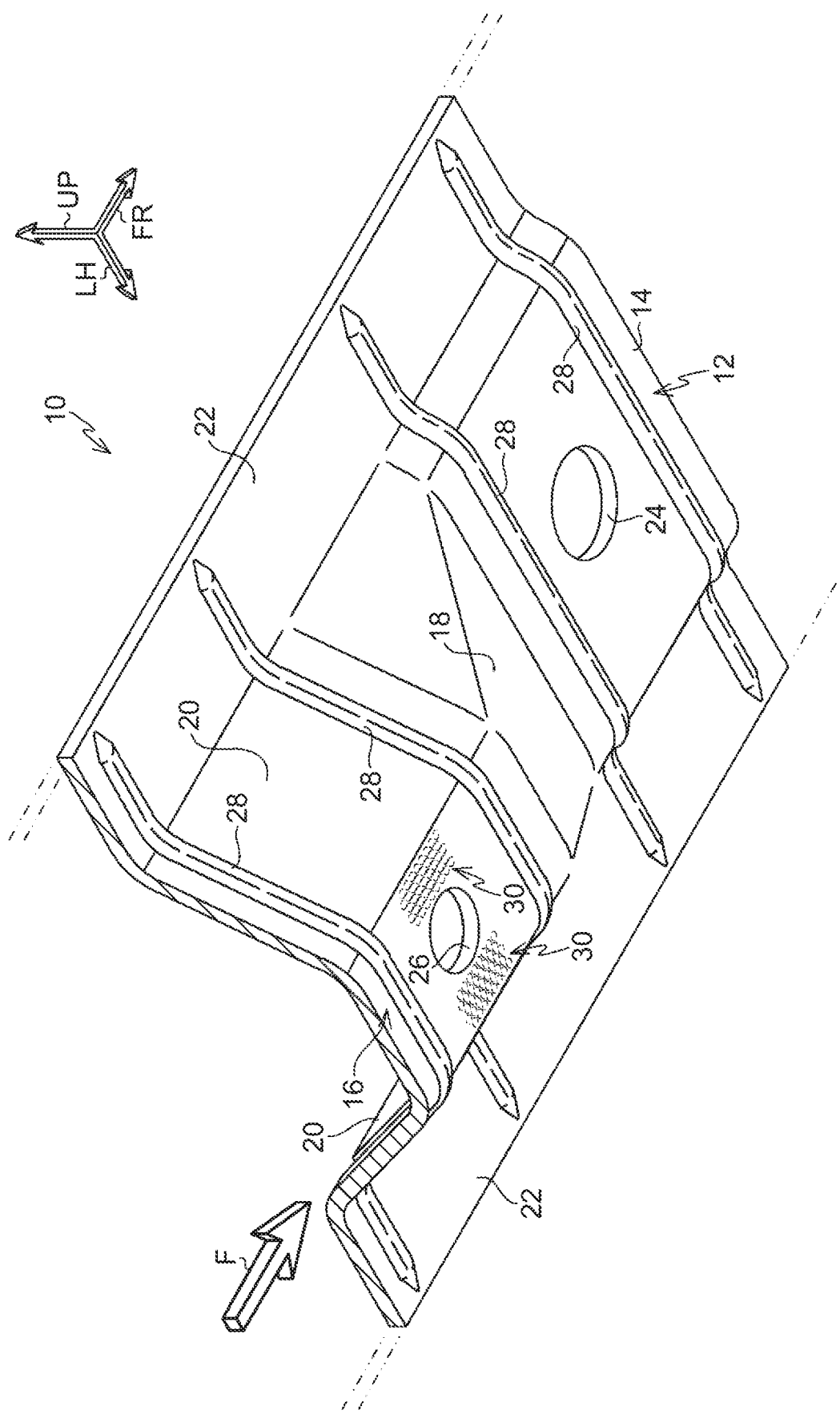
FIG. 3 is a perspective view of the vehicle structure according to the embodiment of the disclosure, seen from a vehicle lower side.
Figure 4:
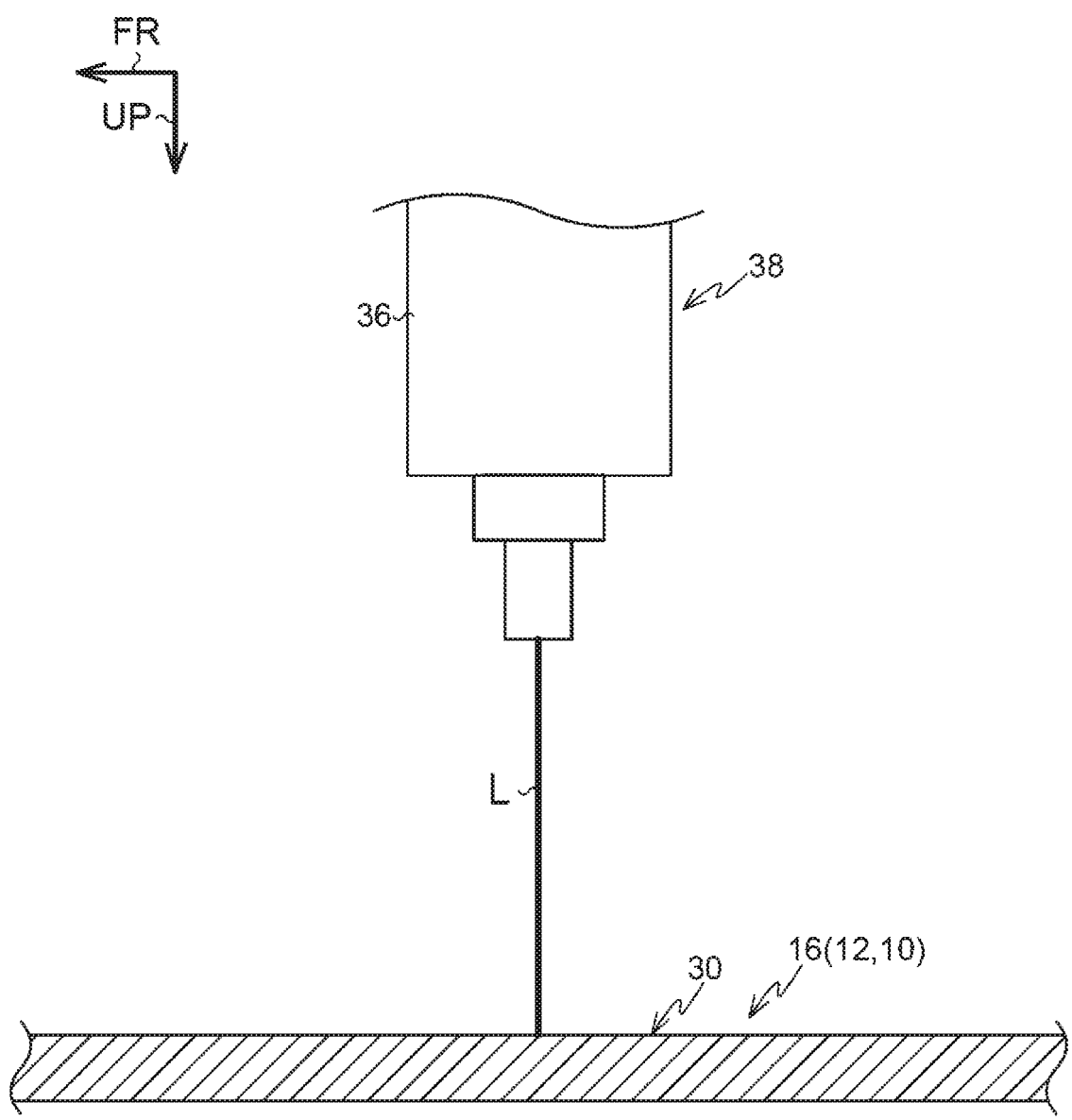
FIG. 4 is a view of a state where a bottom wall rear portion of the vehicle structure is irradiated by a laser beam from a remote laser device.

As shown in FIG. 3, the vehicle structure 10 according to the embodiment is formed as a steel plate (including a high-tensile steel plate having a tensile strength of 490 MPa or higher, a super high-tensile steel plate having a tensile strength of 980 MPa of higher, and the like) is pressed. A longitudinal direction of the vehicle structure 10 is an almost vehicle front-rear direction.

The vehicle structure 10 includes a bottom wall 12, and the bottom wall 12 includes a bottom wall front portion 14 and a bottom wall rear portion 16. Each of the bottom wall front portion 14 and the bottom wall rear portion 16 has a plate shape, and a thickness direction of each of the bottom wall front portion 14 and the bottom wall rear portion 16 is almost a vehicle upper-lower direction. The bottom wall rear portion 16 is disposed behind the bottom wall front portion 14 in the vehicle front-rear direction and disposed above the bottom wall front portion in the vehicle upper-lower direction.

The bottom wall 12 includes a bottom wall intermediate portion 18. The bottom wall intermediate portion 18 has a plate shape, and a thickness direction of the bottom wall intermediate portion 18 is a direction inclined in the vehicle front-rear direction with respect to the vehicle upper-lower direction. A front end of the bottom wall intermediate portion 18 in the vehicle front-rear direction is connected with a rear end of the bottom wall front portion 14 in the vehicle front-rear direction, and a rear end of the bottom wall intermediate portion 18 in the vehicle front-rear direction is connected with a front end of the bottom wall rear portion 16 in the vehicle front-rear direction. This means that, as a whole, the bottom wall 12 has a shape that is bent in the vehicle upper-lower direction at an intermediate portion in the vehicle front-rear direction into a crank shape when seen in the vehicle width direction.

Side walls 20 are provided on both sides of the bottom wall 12 in the vehicle width direction, respectively. The side wall 20 on the left side in the vehicle width direction extends from a left end of the bottom wall 12 in the vehicle width direction towards a direction inclined to the left side in the vehicle width direction with respect to the vehicle upper side. Further, a flange 22 extends to the left side in the vehicle width direction from an end portion of the side wall 20 on the left side in the vehicle width direction, the end portion being on the opposite side of the side wall 20 from the bottom wall 12. Meanwhile, the side wall 20 on the right side in the vehicle width direction extends from a right end of the bottom wall 12 in the vehicle width direction towards a direction inclined to the right side in the vehicle width direction with respect to the vehicle upper side. Further, a flange 22 extends to the right side in the vehicle width direction from an end portion of the side wall 20 on the right side in the vehicle width direction, the end portion being on the opposite side of the side wall 20 from the bottom wall 12. This means that a sectional shape of the vehicle structure 10 taken along a direction orthogonal to the longitudinal direction of the vehicle structure 10 has a hat shape that is open towards the vehicle upper side.

Both of the flanges 22 of the vehicle structure 10 are joined to, for example, flanges of another hat-shaped vehicle structure disposed above the vehicle structure 10 in the vehicle upper-lower direction, the hat shape being open to the vehicle lower side, or to another vehicle structure having a flat-plate shape, by welding and so on. In a state where the vehicle structure 10 is joined to another vehicle structure as described above, the sectional shape of the vehicle structure 10 taken along the direction orthogonal to the longitudinal direction of the vehicle structure 10 is closed. The vehicle structure 10 described above is, for example, a rear portion of a rear member in the vehicle front-rear direction, the rear member being disposed in a portion of a vehicle on the vehicle rear side. When a vehicle collides with the vehicle rear side of the vehicle to which the vehicle structure 10 is applied, a load F is input to the vehicle structure 10 from the vehicle rear side of the vehicle structure 10.

Further, as shown in FIG. 3, a front hole portion 24 is formed in the bottom wall front portion 14 of the bottom wall 12 of the vehicle structure 10. The front hole portion 24 has an almost circular shape when seen in the vehicle upper-lower direction, and passes through the bottom wall front portion 14. Also, a rear hole portion 26 is formed in the bottom wall rear portion 16 of the bottom wall 12 of the vehicle structure 10. The rear hole portion 26 has an almost circular shape when seen in the vehicle upper-lower direction, and passes through the bottom wall rear portion 16. Further, as shown in FIG. 3, a plurality of beads 28 is formed in the vehicle structure 10. The longitudinal direction of the beads 28 is the vehicle width direction, and the beads 28 are formed at given intervals in the vehicle front-rear direction. Each of the beads 28 is formed so as to extend over both of the side walls 20 and the bottom wall 12 between an intermediate portion of one of the flanges 22 of the vehicle structure 10 in the vehicle width direction and an intermediate portion of the other flange 22 in the vehicle width direction. In the portions of the vehicle structure 10 where the beads 28 are formed, the vehicle structure 10 is bent so as to expand towards the vehicle lower side. Therefore, when, for example, the load F is input to the vehicle structure 10 from the vehicle rear side, compression deformation of the vehicle structure 10 is induced in the beads 28.

Further, as shown in FIG. 3, the front hole portion 24 is formed in the bottom wall front portion 14 of the bottom wall 12 of the vehicle structure 10. The front hole portion 24 has an almost circular shape when seen in the vehicle upper-lower direction and passes through the bottom wall front portion 14. Further, the rear hole portion 26 is formed in the bottom wall rear portion 16 of the bottom wall 12 of the vehicle structure 10. The rear hole portion 26 has an almost circular shape when seen in the vehicle upper-lower direction and passes through the bottom wall rear portion 16. The rear hole portion 26 serves as, for example, a reference for assembly of the vehicle structure 10 and another member.

Figure 2:
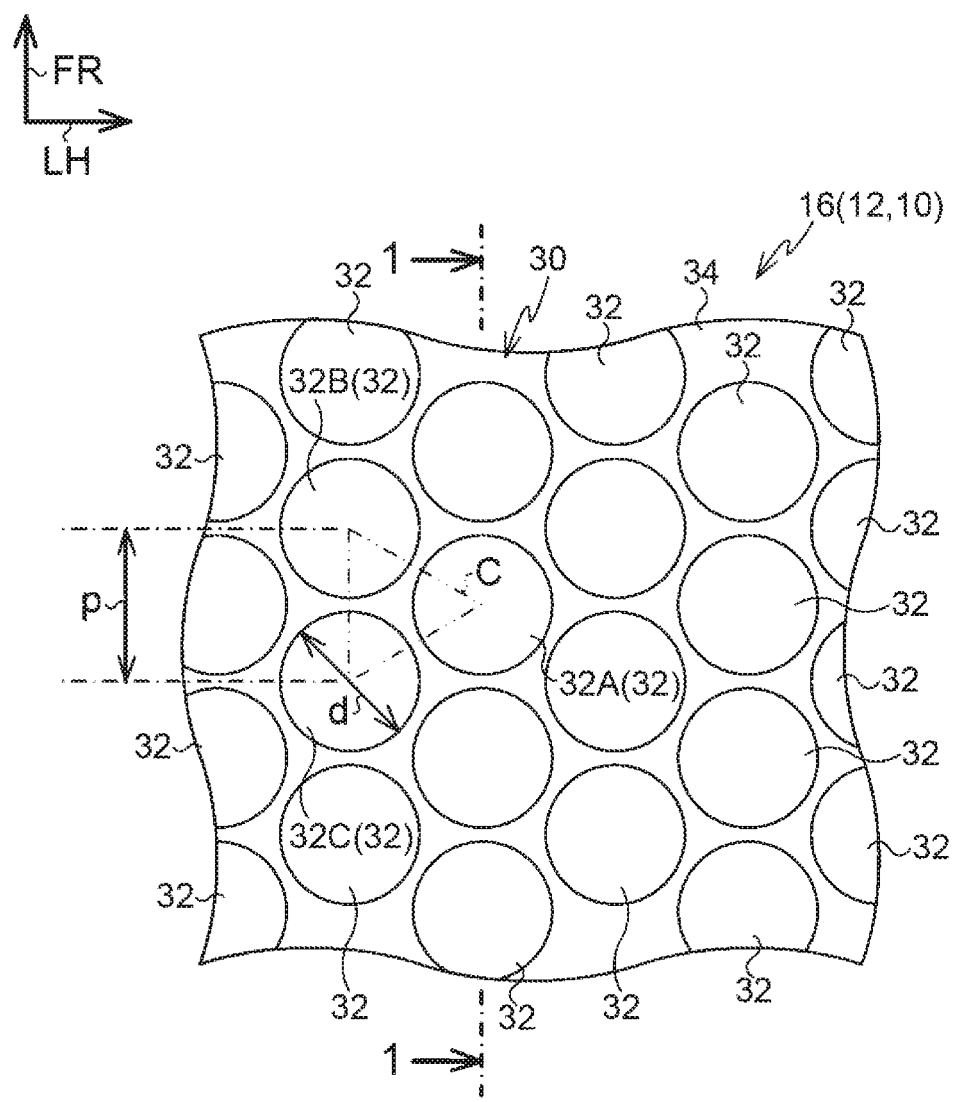
FIG. 2 is an enlarged bottom view of a heat-treated portion of the vehicle structure according to the embodiment of the disclosure.

Further, as shown in FIG. 3, in the bottom wall rear portion 16, heat-treated portions 30 are formed on both sides of the rear hole portion 26 in the vehicle width direction, respectively. As shown in FIG. 2, the heat-treated portions 30 include a plurality of hardened portions 32. An outer peripheral shape of each of the hardened portions 32 seen from the lower side in the vehicle upper-lower direction (for example, a surface side of the bottom wall rear portion 16 in the thickness direction), in other words, a shape of a boundary between the hardened portion 32 and a base material portion 34 of the bottom wall rear portion 16 other than the hardened portions 32 is an almost circular shape. A diameter dimension d of the hardened portion 32 when the shape of the hardened portion 32 is regarded as a circle in a view of the hardened portion 32 in the thickness direction of the bottom wall rear portion 16 is larger than a thickness dimension of the bottom wall rear portion 16, and is set to a value smaller than twice the thickness dimension of the bottom wall rear portion 16.

Figure 1:
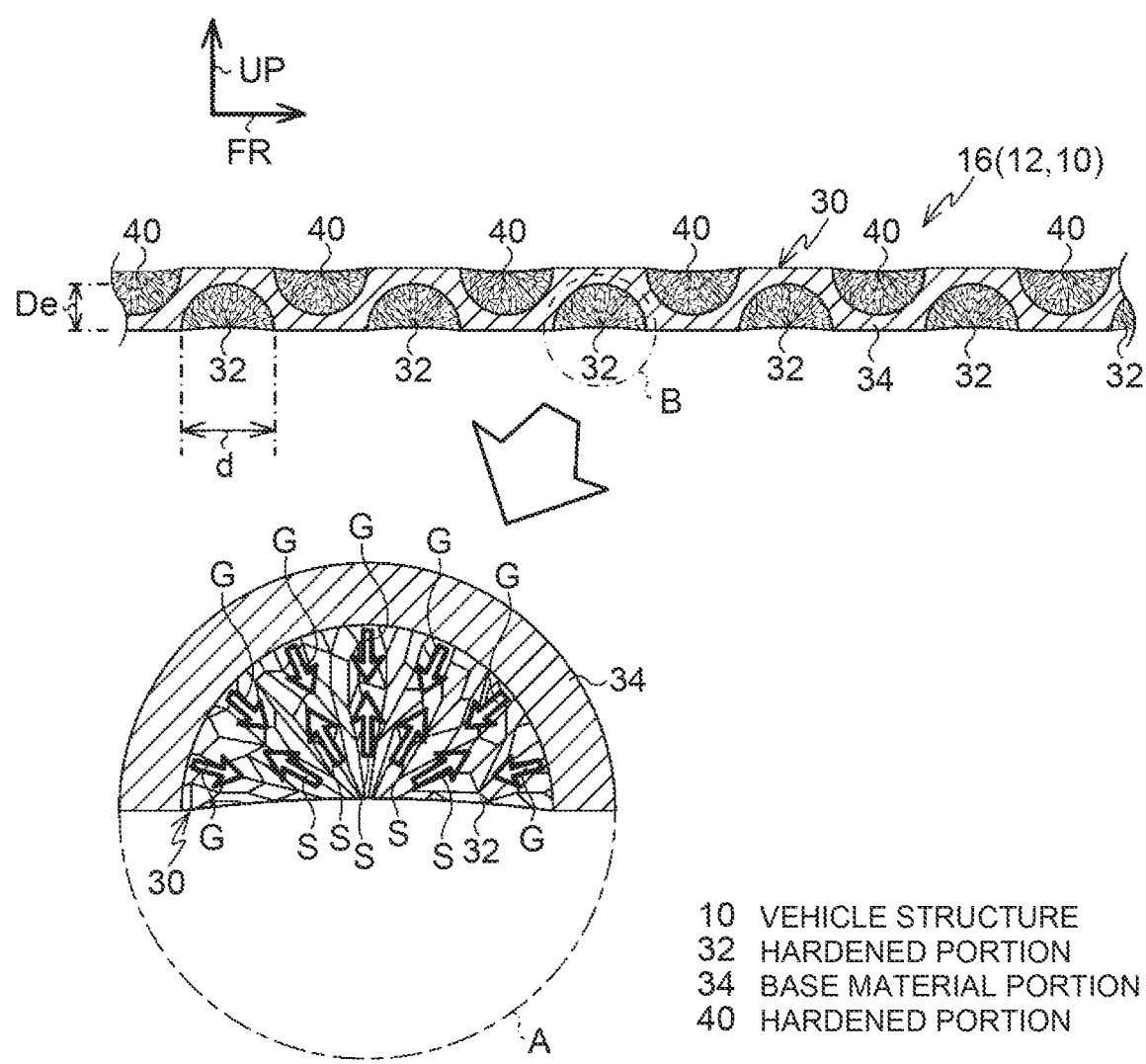
FIG. 1 is an enlarged sectional view of a vehicle structure according to an embodiment of the disclosure taken along the line 1-1 in FIG. 2, and a part shown by a dashed line A in the drawing is a farther enlarged view of a part shown by a dashed line B in the drawing.

Also, as shown in FIG. 1, a sectional shape of each of the hardened portions 32 is an almost semicircular shape. The section of each of the hardened portions 32 is taken along a direction orthogonal to the thickness direction of the bottom wall rear portion 16 at an almost center of the hardened portion 32 when the hardened portion 32 is seen in the thickness direction of the bottom wall rear portion 16. In other words, the sectional shape of the hardened portion 32 is a shape of a boundary between the hardened portion 32 and the base material portion 34. A center of a curvature in the sectional shape of the hardened portion 32 is located on the lower surface side of the bottom wall rear portion 16 in the vehicle upper-lower direction. Further, when the shape of each of the hardened portions 32 is regarded as a circular shape when the hardened portions 32 are seen in the thickness direction of the bottom wall rear portion 16, the diameter dimension d of the hardened portion 32 is almost twice as large as a maximum dimension De of the hardened portion 32 in the thickness direction of the bottom wall rear portion 16.

As shown in FIG. 2, the hardened portions 32 are formed at given intervals in the vehicle front-rear direction so as to form a row on the bottom wall rear portion 16. Further, the hardened portion 32 (for example, the hardened portion 32A shown in FIG. 2) is disposed at almost the center between a pair of the hardened portions 32 (for example, the hardened portion 32B and the hardened portion 32C in FIG. 2) adjacent to each other in the vehicle front-rear direction (in other words, a row direction) in a different row adjacent to the hardened portion 32A in the vehicle width direction. Thus, the hardened portions 32 are disposed in a staggered pattern as a whole.

A shape (a shape shown by a two-dot chain line C in FIG. 2) that is formed as the center of each of the hardened portions 32 adjacent to each other in the above-mentioned row direction (the vehicle front-rear direction) (for example, each of the centers of the hardened portions 32B, 32C shown in FIG. 2), and the center of the hardened portion 32 (for example, the hardened portion 32A in FIG. 2) adjacent to the above-mentioned hardened portions 32 in the row adjacent to the row of the above-mentioned hardened portions 32 are connected with each other is an almost equilateral triangle. Further, when the diameter dimension of the hardened portion 32 is d, and a distance between the centers of the hardened portions 32 adjacent to each other in the vehicle front-rear direction is p, then the diameter dimension d and the distance p between the centers are set so that the following formula (1) is satisfied.

$$p < \frac{2}{\sqrt{3}} \cdot d \qquad \text{Formula (1)}$$

Therefore, in a view of the bottom wall rear portion 16 in the vehicle front-rear direction, among the hardened portions 32 in the rows adjacent to each other in the vehicle width direction, a right-side portion of the hardened portion 32 in the vehicle width direction, the hardened portion 32 being located on the relatively left side in the vehicle width direction, overlaps a left-side portion of the hardened portion 32 in the vehicle width direction, the hardened portion 32 being located on the relatively right side in the vehicle width direction.

The hardened portions 32 described above are formed with use of, for example, a remote laser device 38 (see FIG. 4) having a scanner 36. This means that, as shown in FIG.

4, the lower surface of the bottom wall rear portion 16 in the vehicle upper-lower direction is irradiated in dot shapes by a laser beam L with high energy density emitted from the remote laser device 38. Therefore, portions of the lower surface of the bottom wall rear portion 16 in the vehicle upper-lower direction irradiated by the laser beam L are heated and melted. After irradiation time of the laser beam L elapses, melted portions of the bottom wall rear portion 16 expand radially (in a hemispherical shape around the lower surface side in the vehicle upper-lower direction that serves as a center of the curvature), and irradiation by the laser beam L is stopped before the melted portions of the bottom wall rear portion 16 reach the upper surface of the bottom wall rear portion 16 in the vehicle upper-lower direction (that is a surface opposite to the surface irradiated by the laser beam L).

Thus, each of the melted portions is formed into an almost hemispherical shape, and the metal structure is recrystallized in the melted portion. In this state, temperature of each of the melted portions having the almost hemispherical shape is high on a radially inner side, and temperature of each of the melted portions having the almost hemispherical shape is low on a radially outer side. Therefore, once irradiation of the laser beam L is stopped, and cooling and solidification of the melted portions begin, cooling and solidification of the melted portions progress from the radially outer side of each of the melted portions towards the radially inner side of each of the melted portions. The hardened portions 32 formed as described above become harder than the base material portion 34 of the bottom wall rear portion 16.

For the vehicle structure 10, for example, a high-tensile steel plate with a thickness of 1.6 mm and a tensile strength of 590 Mpa is used. The bottom wall rear portion 16 of the vehicle structure 10 described above is irradiated with the laser beam L having an output of 2 kW for about a millisecond with a condensing diameter of 800 μm, and, as the bottom wall rear portion 16 is heated and melted, the hardened portions 32 are formed. Hardness in Vickers hardness value of the hardened portions 32 formed as described above reaches 400 Hv, and the hardened portions 32 become harder than the base material portion 34 having a Vickers hardness value of 220 Hv.

Further, as shown in FIG. 1, in the bottom wall rear portion 16 of the vehicle structure 10, a plurality of hardened portions 40 is formed. While the hardened portions 32 described above are formed below, in the vehicle upper-lower direction, an intermediate portion of the bottom wall rear portion 16 in the thickness direction (on a surface side of the bottom wall rear portion 16 in the thickness direction), the hardened portions 40 are formed above, in the vehicle upper-lower direction, the intermediate portion of the bottom wall rear portion 16 in the thickness direction (on a back surface side of the bottom wall rear portion 16 in the thickness direction). A shape of each of the hardened portions 40 (a shape of a boundary between each of the hardened portions 40 and the base material portion 34) is an almost hemispherical shape around the upper surface side of the bottom wall rear portion 16 in the vehicle upper-lower direction, the upper surface side serving as a center of a curvature. The hardened portions 40 have basically the same structure except forming positions and shapes.

The hardened portions 40 are provided in a staggered pattern in which a direction of a row is along the vehicle front-rear direction. Also, as shown in FIG. 1, each of the hardened portions 40 is disposed between the hardened portions 32 that are adjacent to each other in the row direction (the vehicle front-rear direction). In a view of the bottom wall rear portion 16 in the vehicle front-rear direction, an upper portion of each of the hardened portions 32 in the vehicle upper-lower direction and a lower portion of each of the hardened portions 40 in the vehicle upper-lower direction overlap each other.

Actions and Effects of the Embodiment

When the load F (see FIG. 3) is input from the vehicle rear side to the vehicle structure 10 according to the embodiment, deformation is induced in the beads 28. Due to this, the vehicle structure 10 is deformed so as to contract in the vehicle front-rear direction. In the vehicle structure 10, the rear hole portion 26 is formed in the bottom wall rear portion 16 of the bottom wall 12. Therefore, when the vehicle structure 10 is deformed so as to contract in the vehicle front-rear direction, buckling is likely to happen to the bottom wall rear portion 16 on sides of the rear hole portion 26 in the vehicle width direction.

However, on the sides of the rear hole portion 26 in the vehicle width direction, the heat-treated portions 30 including the hardened portions 32, 40 are formed in the bottom wall rear portion 16. As described earlier, the hardened portions 32, 40 are harder than the base material portion 34 of the bottom wall rear portion 16 excluding the hardened portions 32, 40. Therefore, bending deformation on the sides of the rear hole portion 26 of the bottom wall rear portion 16 in the vehicle width direction is inhibited. Thus, it is possible to inhibit above-mentioned buckling on the sides of the rear hole portion 26 of the bottom wall rear portion 16 in the vehicle width direction, and it is possible to control deformation of the vehicle structure 10 caused by the load F from the vehicle rear side.

Meanwhile, as described above, in the embodiment, when the hardened portions 32, 40 are formed in the bottom wall rear portion 16 of the bottom wall 12 of the vehicle structure 10, the bottom wall rear portion 16 is melted by the laser beam L with high energy density emitted from the remote laser device 38. In the melted portions of the bottom wall rear portion 16, the metal structure of the bottom wall rear portion 16 is recrystallized, and further, crystal grains grow. When, for example, once these melted portions are cooled naturally and solidified, the hardened portions 32, 40 are formed.

Here, irradiation with the laser beam L is stopped before the melted portions of the bottom wall rear portion 16 reach the surface of the bottom wall rear portion 16 opposite to the surface irradiated by the laser beam L. Thus, the melted portions (that are the cooled and solidified hardened portions 32, 40) are formed into the almost hemispherical shape. Cooling and solidification of these melted portions having the almost hemispherical shape start from the radially outer side, and cooling and solidification of the melted portions progress from the radially outer side to the radially inner side of each of the melted portions (an arrow G direction in FIG. 1).

Cooling and solidification of the melted portions cause contraction. Therefore, tensile stress S is generated in the hardened portions 32, 40. As cooling and solidification of the melted portions progress from the radially outer side to the radially inner side in each of the melted portions, a direction of the contraction is almost the radial direction of each of the melted portions. Therefore, the direction of the tensile stress S generated in each of the hardened portions 32, 40 is generally a radial direction (to the radially outer side) starting from the center of the curvature of each of the hardened portions 32, 40.

For example, when the center of the curvature of each of the hardened portions 32 is positioned on the lower surface of the bottom wall rear portion 16 in the vehicle upper-lower direction (in other words, when the shape of each of the hardened portions 32 is a hemispherical shape), only directions opposite to each other along the radial directions around the center of the curvature are directions along the lower surface of the bottom wall rear portion 16 in the vehicle upper-lower direction (in other words, directions orthogonal to the thickness direction of the bottom wall rear portion 16). Further, when the center of the curvature is positioned below, in the vehicle upper-lower direction, the lower surface of the bottom wall rear portion 16 in the vehicle upper-lower direction, directions opposite to each other in the radial directions around the center of the curvature are positioned further below, in the vehicle upper-lower direction, the lower surface of the bottom wall rear portion 16 in the vehicle upper-lower direction, and there are no directions opposite to each other along the above-mentioned radial directions within each of the hardened portions 32.

Therefore, since the tensile stress S is generated in radial directions in each of the hardened portions 32, 40, it is possible to inhibit generation of the tensile stress S in the directions opposite to each other, especially generation of the tensile stress S in the directions opposite to each other by which a specific portion within each of the hardened portions 32, 40 is pulled apart in the direction orthogonal to the thickness direction of the bottom wall rear portion 16. Thus, for example, when the load F (see FIG. 3) is applied to the vehicle structure 10 from the vehicle rear side, it is possible to inhibit occurrence of cracks and breakage in the hardened portions 32, 40.

Further, the hardened portions 32 are provided in the bottom wall rear portion 16 in the staggered pattern. Moreover, the shape formed as the centers of the two hardened portions 32 adjacent to each other in the row direction (the vehicle front-rear direction) (for example, the centers of the hardened portions 32B, 32C in FIG. 2), and the center of the hardened portion 32 (for example, the hardened portion 32A in FIG. 2) adjacent to the two hardened portions 32 and positioned on a row adjacent to the row of the two hardened portions 32 are connected with each other is an almost triangle. Moreover, the diameter dimension d of each of the hardened portions 32 and the distance p between the centers of the hardened portions 32 adjacent to each other in the vehicle front-rear direction satisfy a relation expressed by the following formula (1).

$$p < \frac{2}{\sqrt{3}} \cdot d \qquad \text{Formula (1)}$$

Therefore, in the view of the bottom wall rear portion 16 in the vehicle front-rear direction, among the hardened portions 32 in the rows adjacent to each other in the vehicle width direction, a right-side portion of the hardened portion 32 in the vehicle width direction, the hardened portion 32 being located on the relatively left side in the vehicle width direction, overlaps a left-side portion of the hardened portion 32 in the vehicle width direction, the hardened portion 32 being located on the relatively right side in the vehicle width direction. Therefore, it is possible to dispose the hardened portions 32 densely. Because of this, even when a direction of external force input to the bottom wall rear portion 16 is any direction orthogonal to the thickness direction of the bottom wall rear portion 16, it is possible to inhibit the external force from bypassing the hardened portions 32. Thus, it is possible to control deformation of the bottom wall rear portion 16 with respect to external force in various directions orthogonal to the thickness direction of the bottom wall rear portion 16.

Further, the hardened portions 32 are formed on the lower surface side of the bottom wall rear portion 16 below, in the vehicle upper-lower direction, the intermediate portion of the bottom wall rear portion 16 in the thickness direction of the bottom wall rear portion 16. Also, the hardened portions 40 are formed on the upper surface side of the bottom wall rear portion 16 above, in the vehicle upper-lower direction, the intermediate portion of the bottom wall rear portion 16 in the thickness direction of the bottom wall rear portion 16. Further, the maximum dimension De (see FIG. 1) of each of the hardened portions 32, 40 in the thickness direction of the bottom wall rear portion 16 is larger than a half of the thickness dimension of the bottom wall rear portion 16. Further, the hardened portions 40 are formed in the staggered pattern, and also, in the view in the vehicle width direction, each of the hardened portions 40 is disposed between the hardened portions 32 that are adjacent to each other in the vehicle front-rear direction. Therefore, thermal strain generated in the bottom wall rear portion 16 due to forming of either the hardened portions 32 or the hardened portions 40 is canceled by thermal strain generated in the bottom wall rear portion 16 due to forming of the other one of the hardened portions 32 or the hardened portions 40. Therefore, it is possible to inhibit large thermal strain of the bottom wall rear portion 16.

In the embodiment, the shape of each of the hardened portions 32, 40 is an almost hemispherical shape. This means that, when the shape of each of the hardened portions 32, 40 seen in the thickness direction of the bottom wall rear portion 16 is regarded as a circular shape, the diameter dimension d of each of the hardened portions 32, 40 is about twice as large as the maximum dimension De of each of the hardened portions 32, 40 in the thickness direction of the bottom wall rear portion 16. However, the diameter dimension d may be larger than twice the maximum dimension De.

Further, in the embodiment, the hardened portions 32, 40 are disposed in the staggered pattern. However, the hardened portions 32, 40 may be disposed in a matrix or randomly.

Further, in the embodiment, the hardened portions 32 and the hardened portions 40 are formed in the bottom wall rear portion 16. However, only either the hardened portions 32 or the hardened portions 40 may be formed in the bottom wall rear portion 16.

Further, in the embodiment, the vehicle structure 10 is applied to a rear portion of the rear member in the vehicle front-rear direction, the rear member being disposed in a portion of a vehicle on the vehicle rear side. However, a portion where the vehicle structure 10 is applied is not limited, and the vehicle structure 10 is widely applicable as long as it is applied to a structure used in a body of a vehicle.

What is claimed is:

1. A vehicle structure comprising:
   a base material portion formed into a plate shape from a steel plate; and
   a plurality of hardened portions that are formed as a part of the base material portion are heated and melted from a surface of the base material portion on a first side in a thickness direction through an intermediate portion of the base material portion in the thickness direction, and then cooled and solidified so that a boundary between the hardened portions and the base material portion has a curved shape that is formed around the first side of the base material portion in the thickness direction, the first side of the base material portion serving as a center of a curvature, the hardened portions are formed on both a surface side and a back surface side of the base material portion in the thickness direction, respectively, the hardened portions are disposed in line at given intervals on the surface side, the hardened portions on the back surface side are disposed between the hardened portions adjacent to each other on the surface side, and each of the hardened portions on the surface side and each of the hardened portions on the back surface side overlap each other in a view in an array direction of the hardened portions on the surface side.

2. The vehicle structure according to claim 1, wherein a diameter dimension of the hardened portions when the hardened portions are seen from a side of the thickness direction of the base material portion is at least twice as large as a maximum dimension of the hardened portion in the thickness direction of the base material portion.

3. The vehicle structure according to claim 1, wherein three of the hardened portions are included which are adjacent to each other in a direction orthogonal to the thickness direction of the base material portion so that a shape formed as centers of the hardened portions are connected with each other is an almost equilateral triangle in a view from the side of the thickness direction of the base material portion.

4. The vehicle structure according to claim 3, wherein:
the hardened portions are disposed in a staggered pattern when the hardened portions are seen from the first side of the base material portion in the thickness direction; and
a relation between an interval p between the centers of the hardened portions adjacent to each other, and a diameter dimension d of each of the hardened portions satisfies a following formula $$p < \frac{2}{\sqrt{3}} \cdot d.$$

* * * * *